May 1, 1951     E. HOFFMAN ET AL     2,550,999
SAFETY TRACTOR STOP

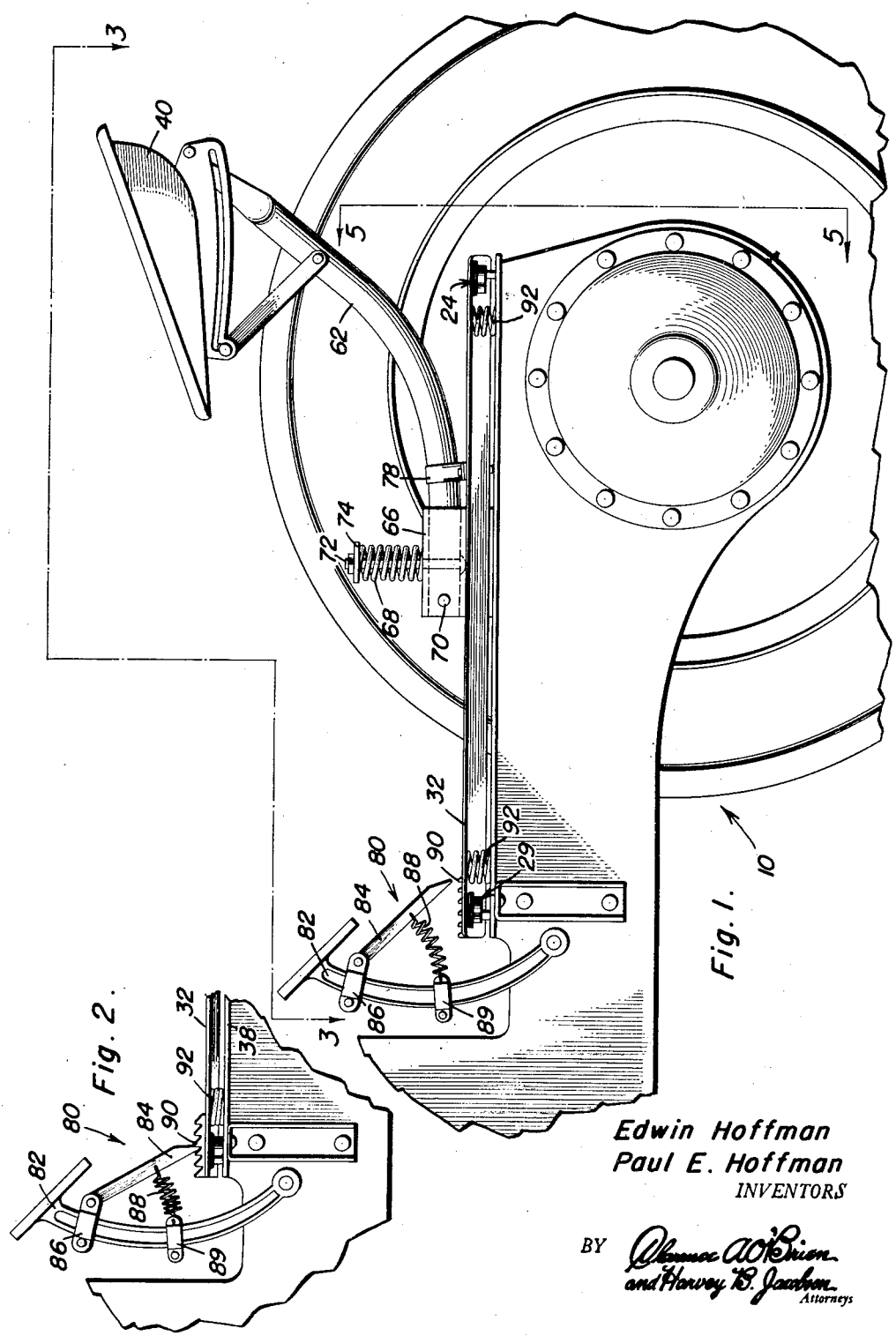

Filed Jan. 21, 1949     3 Sheets-Sheet 2

Edwin Hoffman
Paul E. Hoffman
INVENTORS

May 1, 1951      E. HOFFMAN ET AL      2,550,999
SAFETY TRACTOR STOP
Filed Jan. 21, 1949      3 Sheets-Sheet 3
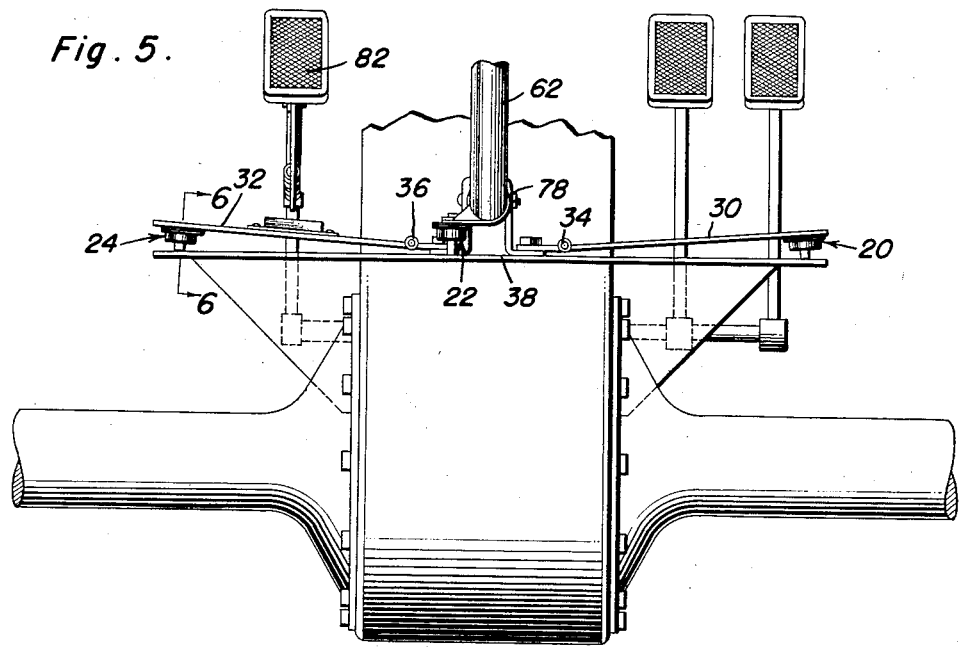
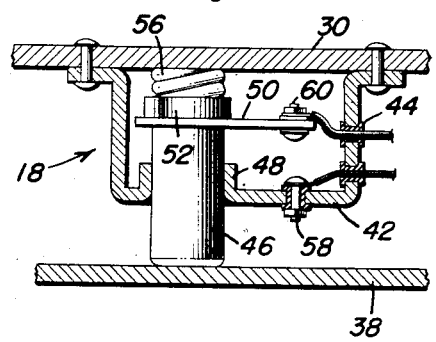
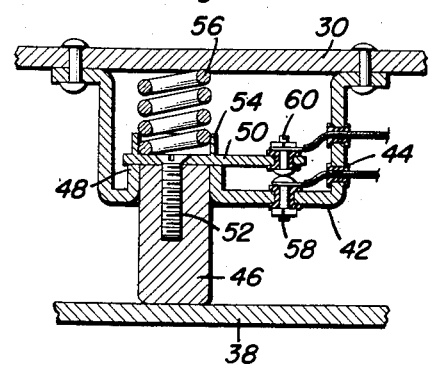
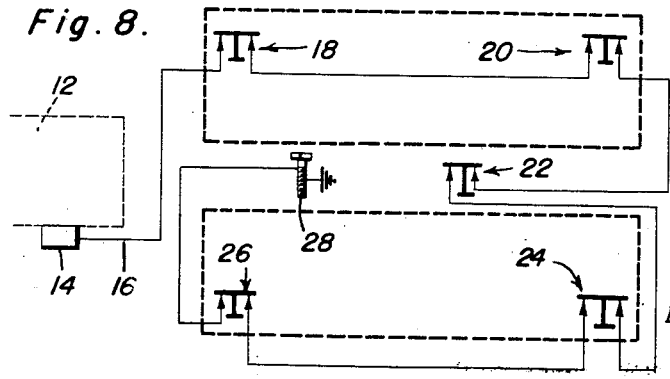
Edwin Hoffman
Paul E. Hoffman
INVENTORS Patented May 1, 1951

2,550,999

UNITED STATES PATENT OFFICE 2,550,999

SAFETY TRACTOR STOP

Edwin Hoffman and Paul E. Hoffman, Defiance, Ohio

Application January 21, 1949, Serial No. 71,804

2 Claims. (Cl. 200—52)

This invention relates to novel and useful improvements in attachments for tractors.

An object of this invention is to render a tractor inoperative under emergency conditions automatically by several cooperative means including a switch which is responsive to the weight of an individual normally seated on a conventional tractor seat and by the weight of an individual foot pressing on a foot rest.

Another object of this invention is to render a tractor capable of becoming operative when one of the aforementioned forces is present and also providing a structural arrangement whereby the tractor may be rendered operative in the absence of one of these forces by utility of a holder or stop which retains one of the switches forming a portion of the structural make-up of the invention in the open position.

Another object of this invention is to supply a number of switches in the conventional electrical circuit of a tractor, which switches are retained normally in the closed position thereby grounding the usual and conventional electrical circuit of a tractor until such time that a force is applied to the physical switches thereby opening them and completing the circuit, all of the switches being provided in series, whereby the tractor may be rendered operative by opening any one or all of the switches.

Another object of this invention is to supply an extremely simplified device of the character to be described which is practical from the commercial standpoint and also from the operational standpoint.

Ancillary objects and features of novelty will become apparent to those skilled in the art, in following the description of the preferred form of the invention, illustrated in the accompanying drawings, wherein:

Figure 1 is an elevational view of a fragmentary portion of a tractor having the preferred form of the invention applied thereto;

Figure 2 is an enlarged fractional portion of the device shown in Figure 1, showing a second operative position thereof;

Figure 5 is an elevational view taken substantially on the line 5—5 of Figure 1 and in the direction of the arrows;

Figure 6 is an enlarged sectional view illustrating details of one of the switches taken substantially on the line 6—6 of Figure 5 and in the direction of the arrows;

Figure 7 is a sectional view similar to that shown in Figure 6, the operative elements of the switch and associated mechanism being in a second position; and Figure 8 is a schematic view illustrating a wiring diagram including a portion of the conventional electrical circuit of a tractor and the additional wiring necessary in the application of the device to a tractor.

Figure 3:
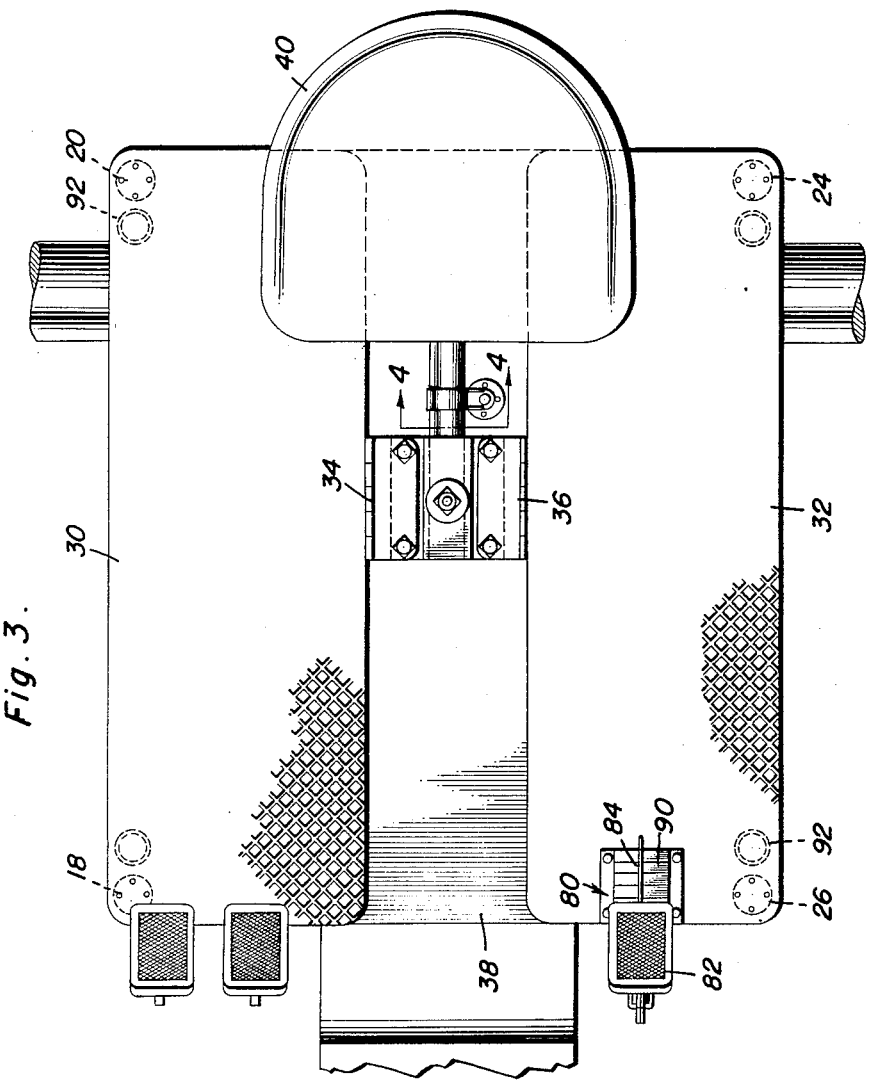
Figure 3 is a fragmentary plan view of a tractor, showing the invention applied thereto and taken substantially on the line 3—3 of Figure 1 in the direction of the arrows.

Structurally, it is necessary that a device for use in conjunction with farm equipment be extremely simplified as well as efficient and practical before it is commercially feasible. Hence, this is one of the prime intents of the present invention.

A conventional tractor generally indicated at 10 is illustrated as the preferred environment for use with the invention. The tractor includes (shown schematically in Figure 8) an engine 12 having a distributor or magneto 14 as a necessary adjunct for use therewith. A hot wire 16 extends from the magneto shown in Figure 8 and terminates at a switch generally indicated at 18. In the ordinary electrical circuit, this hot wire would not lead to a switch but would lead to another component of the tractor which is unimportant in so far as the adaptability of the present device is concerned, or is a simple ground wire.

As is seen, switches 20, 22, 24 and 26 are supplied in series with the said switch 18, when one of the wires is grounded to a suitable element shown schematically as a bolt 28. This bolt is, of course, fixed to the tractor whereby the tractor frame is used as a ground.

All of the switches being in series, it is apparent that one or more of the switches are opened, current will not flow to the ground bolt 28. Hence, the hot wire 16 is rendered ineffectual for the purpose of grounding the magneto or distributor and the ordinary circuit is permitted to function as a complete circuit. But, when all of the switches are in the position as shown in Figure 8, the magneto is grounded thereby rendering it impossible for the engine to operate.

In order to operate the said switches many structural arrangements may be resorted to. Shown in Figure 3 is one arrangement. This arrangement includes a pair of plates 30 and 32, respectively, which are connected at their inner edges by means of hinges 34 and 36 to a portion 38 of the tractor frame or chassis. Switches 18 and 20, respectively, are carried by the plate 30 while switches 26 and 24 are carried by the plate 32. These plates serve as foot rests for an individual seated on the seat 40 when operating the tractor. Hence, upon application of a force to either of the plates 30 or 32, the switches are depressed thereby opening them and allowing the tractor engine to function.

Reference to Figures 6 and 7 shows the specific structure of the switches. A small housing 42 is fixed by any suitable means such as rivets, welding, bolts, etc., to the under surface of the plate 30 and has a pair of openings therein for the passage of the wires connected with the switch 18. Grommets 44 may be supplied in order to properly insulate the wires.

A plunger 46 is slidable through an opening in the small housing 42 and is guided by means of a flange 48 fixed thereto around the said opening. An arm or plate 50 is fixed to the plunger 46 and is movable therewith. A screw 52 may be used in fixing the arm 50 to the said plunger 46. An annular flange 54 is integrally carried by the arm 50 and forms a seat for a spring 56 or other resilient urging means. One end of the spring seats in the annular flange 54 and the other end reacts on the bottom surface of the plate 30, constantly urging the plunger 46 outwardly of the housing as seen in Figure 7. Contacts 58 and 60, respectively, are carried by the arm 50 and the said housing 42 and are insulated therefrom by means of electrically insulating grommets or the like. The said leads or wires described above terminate in an electrical connection with the said contacts 58 and 60.

With the spring 56 constantly urging the plunger 46 outwardly of the housing, the under surface of the plate 50 forms a stop when it coacts with the guide 48. However, at this time the contacts 58 and 60 are in electrical communication with each other thereby grounding the electrical circuit through the structure of the switch including the plunger 46 which is in contact with a portion 38 of the tractor frame or chassis.

The seat 40 is attached to a support 62 by a conventional adjusting mechanism. This support is carried in the bight 66 of a hold-down member for pivotal movement and opposed by the resiliency of a spring 68. The bight of the holding bracket has a pivot pin 70 passing therethrough and also through the appropriate end of the support 62. A bolt 72 is fixed for movement with the support 62 and has a nut at one end backed by a retainer 74. The said spring 68 reacts on the retainer and the bight 66.

Figure 4:
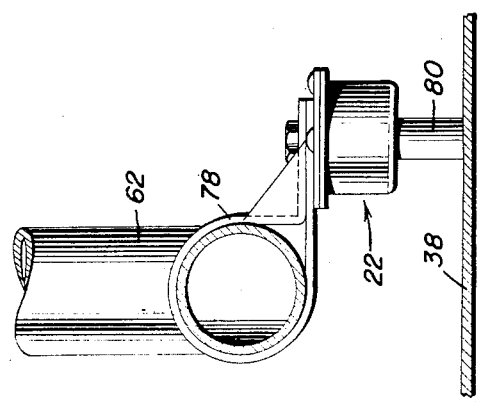
Figure 4 is a sectional view illustrating one of the switches and its structural connection with a portion of a tractor and taken substantially on the line 4—4 of Figure 3 and in the direction of the arrows.

A strap (Figure 4) 76 is secured to the said support 62 and carries the said switch 22. Any suitable fastening means may be used in this connection such as a bolt, spot-welding, etc. In operation, it is noted that as soon as a force is applied to the seat 40 such as by means of the weight of an individual, the support 62 is depressed thereby moving the plunger 80 of the switch 22 downwardly against a portion of the tractor chassis or frame. This spreads the contacts in this switch 22 as described in connection with the switch 18 shown in Figures 6 and 7.

In operation thus far described it is seen that a tractor will not operate unless a force is applied to one of the variously described components in order to open at least one of the switches. This, of course, indicates that as soon as adverse conditions arise as by the operator of the tractor falling therefrom, the tractor becomes immediately inoperative. Occasion may arise, however, wherein it is desired to utilize the power take-off of a tractor without an individual seated thereon. Also, it is appreciated that certain repairs and adjustments must be made on tractors. Under these conditions a means for rendering the attachment ineffectual is supplied. Accessible means consists of a holder mechanism generally indicated at 80 which is fixed to one of the conventional pedals of a tractor and to one of the plates 30 or 32.

Manufacturers of tractors and/or land vehicles in general advise that the clutch plate of the tractor be disengaged before attempting to start the engine. With this in view the clutch arm 82 is chosen as the recipient of the hold-down mechanism.

An arm 84 is pivoted to a bracket 86 which, in turn, is secured to the operating arm of the clutch mechanism. A compression spring 88 is fixed at one end to the arm 84 and at the other end to another bracket 89. The said bracket 89 is carried by the operating arm 82 constantly urging or biasing the arm 84 upwardly with respect to the floor of the tractor. One or more keepers 90 which are similar to teeth are provided on the upper surface of the plate 32 for operative engagement with the end of the arm 84.

In operation, the plate 32 is depressed thereby opening the switches 26 and 24. Then, the arm 84 is simply disposed between the keepers 90 thereby holding the plate 32 in the down position.

In order to release the holder mechanism 80 it is necessary only to depress the clutch pedal 82 downwardly the full amount, thereby sliding the arm 84 in such position that it clears the last keeper 90 and the spring 88 urges it to the up position entirely free from contact with any of the keepers 90.

It is apparent that many variations may be made without departing from the spirit of the invention. Also, certain elements may be added for smoothness of operation, such as the springs 92 shown in Figure 1 which constantly urge the plate upwardly rendering it necessary to apply a positive force to the plate rather than any jarring force which might occur during conventional operation of a tractor over a field.

In view of the foregoing. limitation is sought only in accordance with the scope of the following claims.

Having described the invention, what is claimed as new is:

1. In combination with a tractor which has a longitudinal axis, a control pedal pivoted to the tractor and a dog mounted for pivotal movement on said pedal, a plate hinged for movement along an axis parallel to the longitudinal axis of the tractor and forming a foot rest plate, teeth disposed on said plate and engaged by said dog to hold said plate in a predetermined position when said pedal is depressed, a spring secured to said dog and said pedal normally urging said dog into engagement with said teeth, resilient means opposing the operation of said plate and reacting on the tractor, a switch operable between said plate and the tractor and operatively connected with a portion of the tractor for controlling the operation of said tractor in response to movement of said plate.

2. The combination of claim 1 and a second plate having hinges secured thereto, said hinges being secured to the tractor and arranged so that the axis of rotation of said second plate is parallel to the axis of said tractor, and a second switch operatively connected with said second plate and the tractor associated with a portion of the tractor and arranged to control that portion.

EDWIN HOFFMAN.
PAUL E. HOFFMAN.

REFERENCES CITED

The following references are of record in the file of this patent:

UNITED STATES PATENTS

| Number | Name | Date |
|---|---|---|
| 1,891,998 | Nafziger | Dec. 27, 1932 |
| 1,956,978 | Nafziger | May 1, 1934 |
| 2,036,099 | Ranlett | Mar. 31, 1936 |
| 2,069,970 | Richter | Feb. 9, 1937 |